(12) United States Patent
Wieczorek et al.

(10) Patent No.: US 10,124,722 B2
(45) Date of Patent: Nov. 13, 2018

(54) CONTROL CIRCUIT TO CONTROL AT LEAST ONE LIGHTING DEVICE IN A VEHICLE

(71) Applicant: SMR Patents S.à.r.l., Luxembourg (LU)

(72) Inventors: Romeo Wieczorek, Esslingen (DE); Andreas Herrmann, Winnenden-Baach (DE)

(73) Assignee: SMR PATENTS S.A.R.L., Luxembourg (LU)

( * ) Notice: Subject to any disclaimer, the term of this patent is extended or adjusted under 35 U.S.C. 154(b) by 0 days.

(21) Appl. No.: 15/384,047

(22) Filed: Dec. 19, 2016

(65) Prior Publication Data

US 2017/0182935 A1 Jun. 29, 2017

(30) Foreign Application Priority Data

Dec. 23, 2015 (EP) ..................................... 15202515

(51) Int. Cl.
| | | |
|---|---|---|
| *B60Q 1/14* | (2006.01) | |
| *B60Q 3/258* | (2017.01) | |
| *B60Q 3/76* | (2017.01) | |
| *B60Q 3/80* | (2017.01) | |
| *B60Q 3/16* | (2017.01) | |
| *B60Q 3/85* | (2017.01) | |

(52) U.S. Cl.
CPC .............. *B60Q 3/258* (2017.02); *B60Q 3/76* (2017.02); *B60Q 3/80* (2017.02); *B60Q 3/16* (2017.02); *B60Q 3/85* (2017.02)

(58) Field of Classification Search
CPC .............. B60Q 3/16; B60Q 3/80; B60Q 3/85

USPC .................................. 307/10.1, 10.8; 315/77
See application file for complete search history.

(56) References Cited

U.S. PATENT DOCUMENTS

| | | | | |
|---|---|---|---|---|
| 6,798,152 | B2* | 9/2004 | Rooke ................ | H05B 33/0815 |
| | | | | 315/209 R |
| 9,161,411 | B1* | 10/2015 | Dunn ................... | H05B 33/086 |
| 9,649,977 | B2* | 5/2017 | Dunn ................. | H05B 33/0845 |
| 2012/0086565 | A1 | 4/2012 | Fritz et al. | |

(Continued)

FOREIGN PATENT DOCUMENTS

| | | |
|---|---|---|
| EP | 2602894 A1 | 6/2013 |
| EP | 2744302 A1 | 6/2014 |
| GB | 2434929 A | 8/2007 |

OTHER PUBLICATIONS

Extended European Search Report, Application No. EP 15202515.1 dated Jun. 17, 2016.

*Primary Examiner* — Thuy Vinh Tran
(74) *Attorney, Agent, or Firm* — MacMillan, Sobanski & Todd, LLC

(57) ABSTRACT

A control circuit controls at least one lighting device in a vehicle, preferably in a motor vehicle and includes at least a first output channel and at least a second output channel. The first output channel is adapted to provide a first maximum current, and the second output channel is adapted to provide a second maximum current. At least the first and second output channels are suited to be combined into a third output channel, wherein the third output channel provides a third maximum current. The third maximum current corresponds to the sum of at least a share of the first maximum current and at least a share of the second maximum current.

18 Claims, 2 Drawing Sheets

(56) References Cited

U.S. PATENT DOCUMENTS

2015/0367777 A1* 12/2015 Dunn .................. H05B 33/086
                                                          315/77

* cited by examiner

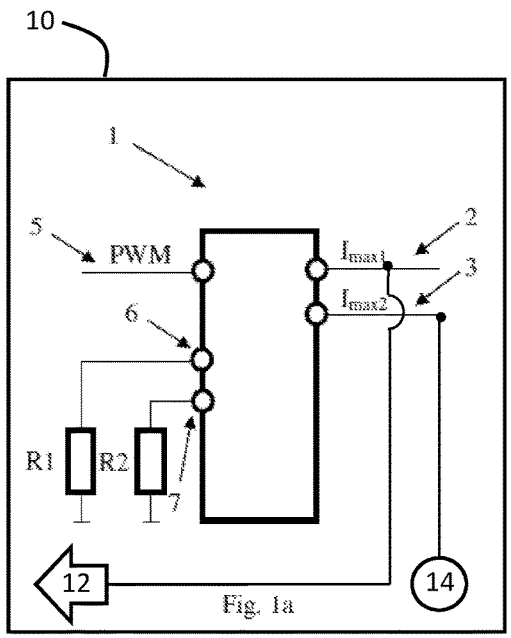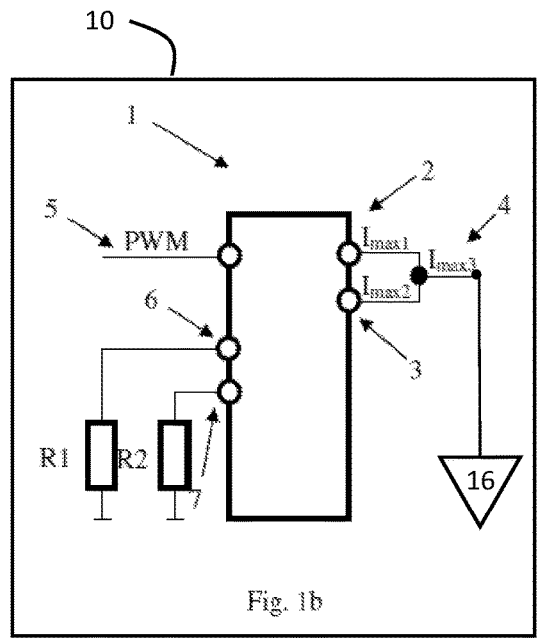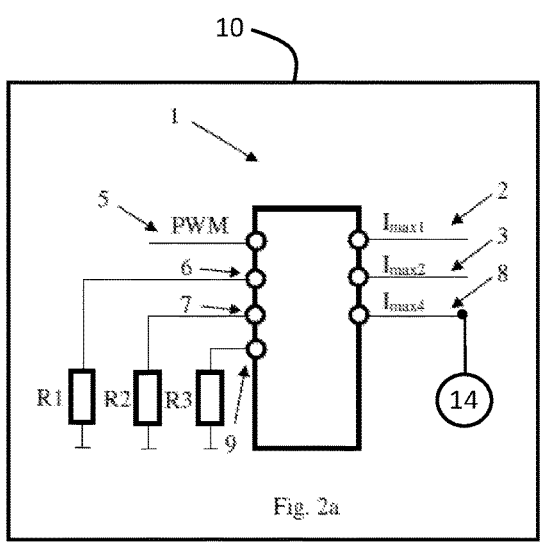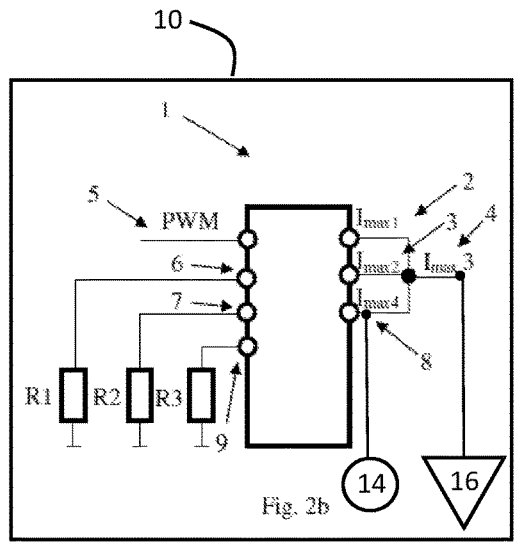

CONTROL CIRCUIT TO CONTROL AT LEAST ONE LIGHTING DEVICE IN A VEHICLE

CROSS-REFERENCE TO RELATED APPLICATIONS

This application claims priority from European Patent Application No. EP 15 202 515.1 filed Dec. 23, 2015, the disclosures of which is incorporated herein by reference in its entirety.

BACKGROUND OF THE INVENTION

This invention relates to a control circuit to control at least one lighting device in a vehicle, preferably in a motor vehicle. The invention also relates to a rear view mirror for a vehicle, preferably for a motor vehicle, having such a control circuit installed therein.

In modern day vehicles, lighting devices are not only used for illuminating the street, or for illuminating the passenger cabin, but also in the rear view mirrors. In the prior art, separate control circuits are known to power the separate lighting devices installed in the vehicle. These control circuits are also known as "Light ICs". For example, a number of different lighting devices could be installed in the rear view mirrors of the vehicle, e.g. for visually indicating a blind spot to the driver, as additional direction indicators, supplementing the direction indicators at the front and rear side of the vehicle, as logo lamp, as puddle light, etc. For all of these different lighting devices, separate control circuits are employed that are each specifically designed for the respective lighting devices. For example, U.S. Pat. No. 5,929,786 A describes a control circuit for blind spot indication. Also, U.S. Pat. No. 6,798,152 B2, GB 2 434 929 A, EP 2 744 302 A1 and U.S. 2012/0086565 A1 relate to control circuits for controlling Light Emitting Diodes, LEDs. EP 2 602 894 A1 relates to a circuit for overload protection.

Therefore, the control circuits that are known in the prior art need to be specifically designed for each specific application. This may lead to a delay in detecting flaws and defects of the control circuits and to a waste of installation room, because several specifically designed control circuits need to be employed. Also, employing specifically designed control circuits prevents the utilization of separately designed developments. Nevertheless, if specifically designed control circuits that have different power demands are to be connected to one single control circuit, the control circuit will most likely be oversized, which leads to a waste of installation space, excessive heat buildup, and high manufacturing costs.

Therefore, it would be desirable to provide a control circuit that is sized so that it can be mounted in components with only limited installation room available, and that can be employed in one single Light IC which can be universally used for various lighting devices having different power requirements.

SUMMARY OF THE INVENTION

The invention provides a control circuit to control at least one lighting device in a vehicle, wherein the control circuit is realized in one single electric circuit, preferably mounted in a component of a motor vehicle, the control circuit comprising: at least a first output channel and at least a second output channel, wherein the first output channel is adapted to provide a first maximum current to at least a first lighting device, and the second output channel is adapted to provide a second maximum current to at least a second lighting device, wherein at least the first and second output channels are suited to be combined into a third output channel, wherein the third output channel provides a third maximum current to at least a third lighting device, with the third maximum current corresponding to the sum of at least a share of the first maximum current and at least a share of the second maximum current.

The control circuit for at least one lighting device is realized in one single electric circuit, such as for example in an Integrated Circuit, IC, on a chip, which can be mounted in a component of a vehicle, preferably in a component of a motor vehicle. For example, the component can be arranged in or at the vehicle and can further comprise at least one lighting device. For example, the control circuit as well as the at least one lighting device could be installed in a rear view device of a vehicle. The term "control circuit" can be used herein to refer to a circuit that is adapted to control the on and off states of the at least one lighting device which might be connected thereto as well as to control the intensity of the light radiated from the at least one lighting device. For example, the at least one lighting device which can be also referred to as light appliance, or just as an appliance, can be a turn signal indicator, a blind spot indicator, a logo lamp, a puddle light, etc. Also, the term "lighting device" can be used to refer to at least one light source that is used in at least one of the above stated appliances.

The control circuit comprises at least a first and a second output channel, wherein the first and the second output channels are each adapted to provide a respective maximum current. The at least two output channels could be realized as at least two output pins of an integrated circuit. Respective lighting devices could be connected between one of the at least two output pins and ground, GND.

The at least first and second output channels are suited to be combined into a third output channel, wherein the third output channel provides a third maximum current, wherein the third maximum current corresponds to the sum of at least a share of the respective maximum currents of the at least first and second output channels. The term "suited to be combined into a third output channel" can be used herein to define that the at least first and second output channels are inter-connectable such that a third maximum current can be provided at the resulting third output channel.

Advantageously, the control circuit can have more than just one channel so that various lighting devices can be connected to the control circuit. However, if a lighting device is to be employed that would exceed the maximum current that is supplied by either one of the individual output channels, the control circuit can be modified into a single channel control circuit. For example, when a single channel configuration is desired, all output channels of the control circuit can be interconnected and just one lighting device can be connected to the resulting output channel. Advantageously, a control circuit having X control channels that can have X respective maximum currents, which can be combined in one single channel providing one single maximum current, can be used to supply X individual lighting devices having power demands that are common for lighting devices, or the control circuit can be used to supply just one lighting device with an increased power demand by combining the X control channels into one single control channel. This solution is particularly advantageous in that not all of the X control channels need to be combined into one single control channel having a maximum current that essentially corresponds to the individual maximum currents of all X control channels, but only as many control channels as necessary could be combined into one control channel, so that the control channel is able to attend to the power requirements of one lighting device that is connected thereto.

Advantageously, separate lighting devices can be controlled by means of one control circuit that is freely adjustable to supply power to various lighting devices that are connected thereto. For example, if separate lighting devices, such as all or any of a turn signal module, a blind spot signal module, a logo lamp and/or a puddle light module, are comprised within a rear view mirror of a vehicle, these separate lighting devices that may have different power demands can be connected to one single control circuit according to the invention. Therefore, just one single control circuit can be mounted in the rear view mirror, instead of several individual control circuits that would be otherwise necessary for each respective lighting device. Therefore, employing just one control circuit is cost efficient and space-saving.

Especially with one single IC type a variety of different LED's can be controlled so that not a plurality of ICs for controlling the different LED's but only one IC has to be held available. Further this single IC does not make it necessary to connect outputs of the IC by an external circuit but allow the connection of the outputs irrespective of the design of an external circuit.

In one example, the third maximum current equals mainly the sum of the first maximum current and the second maximum current and/or the third maximum current is greater than the first maximum current and is greater than the second maximum current.

In one example, the control circuit also comprises at least one control channel, wherein at least the first output channel and/or the second output channel is/are controllable by means of at least one control signal applied to the at least one control channel. Here, the term "control signal" can be used to refer to an electric signal, such as for example to a logic zero, to a logic one, or to a certain sequence of signals. The control signal could be, for example, a signal from a serial bus system, such as from a Controller Area Network, CAN, Bus or from a Local Interconnect Network, LIN, Bus, or any other bus that can be used in the automotive industry. The term "controllable by means of at least one control signal" is used to define that the high and low states of the output channels, i.e. the states where the maximum currents are provided at the output channels can be controlled based on the information conveyed by the control signal.

In case the first and second output channels are combined into a third output channel, the control signal can be correspondingly adjusted so that all output channels are changing their states simultaneously, i.e. similar to the case when just one output channel is controlled.

In one example, the control signal is a pulse-width modulated, PWM, signal, preferably the PWM signal is current controlled by an Electronic Control Unit, ECU, of the vehicle.

In another example, the first output channel and/or the second output channel is/are adapted to provide the first maximum current, and/or the second maximum current to at least a first and/or at least a second lighting device, respectively, and/or the third output channel is adapted to provide the third maximum current to at least a third lighting device. Advantageously, the control circuit can be used as a multi-channel or as a single-channel control circuit, i.e. depending on the current consumption of the connected lighting devices.

In yet another example, the at least first and second output channels are adapted to provide at least two different maximum currents. Here the term "different maximum currents" can be used to refer to at least two different current values that are not substantially equal. By designing the control circuit so that it can provide different maximum currents in different channels, the control circuit can be made very flexible so that a wide range of different lighting devices can be connected to the control circuit. For example, by using such a configuration, two different lighting devices having different current consumptions can be connected to the control circuit. However, if a single lighting device has a current consumption exceeding each of the maximum currents provided in each of the channels, the first and second output channels can be combined into one channel that is able to supply a third maximum current. Here, the term "third maximum current" is used to refer to the combined maximum current of the first and the second output channels.

In one example, the first maximum current is around 150 mA, and/or the second maximum current is around 250 mA. For example, if the first output channel is adapted to provide a maximum current of 150 mA and the second output channel is adapted to provide a maximum current of 250 mA, the third output channel could provide a combined maximum current of 400 mA. The term "around" or "about," particularly to indicate current levels, is indicative of a value considered to be substantially close to the stated value. For example, 150 mA may be indicative of a value of 145 mA to 154 mA based on the relative magnitudes of the compared current values.

In another example, the control circuit further comprises at least a first current control input, wherein the first maximum current is suited to be adjusted via the respective first current control inputs and/or at least a second current control input, wherein the second maximum current is suited to be adjusted via the respective second current control input. For example, the maximum currents can be adjusted by means of respective input signals at the first and second control inputs. Advantageously, the maximum current provided at the respective output channels can be made freely adjustable, so that the control circuit can be quickly modified to comply with the desired application.

In one example, the first maximum current and/or the second maximum current is/are adapted to be adjusted by the resistance value of at least a first resistor connected to the first current control input and/or of at least a second resistor connected to the second current control input. Here, so-called Shunt-Resistors could be advantageously employed to adjust the maximum currents supplied at the respective first and second output channels.

In one example, the control circuit comprises at least one, fourth output channel, preferably a plurality of fourth output channels for a fourth maximum current, preferably with the control circuit comprising at least one fourth current control input to adjust at least one fourth maximum current. Advantageously, the control circuit can comprise more than just two output channels. The maximum currents that are provided on each output could be all different from each other. In this example, up to three different lighting devices could be connected to the control circuit.

Also, in one example, the third maximum current corresponds to the sum of at least a share, preferably mainly the complete, first maximum current and/or second maximum current, or of at least a share, preferably mainly the complete first maximum current, second maximum current and/or at least one preferably a plurality of a fourth maximum currents. Advantageously, if one single lighting device has a current intake that would exceed each of the maximum current values supplied by each individual output channel of the control circuit that is described in this example, two output channels can be combined into one third channel to provide a combined maximum current to the single lighting device. In this example, another lighting device could be connected to the fourth output channel and could be used in parallel to the single lighting device that is connected to the third output channel.

In yet another example, the control circuit comprises at least an integrated circuit, IC. Advantageously, the dimension of an IC allows the control circuit to be installed even in areas with limited mounting space available. Therefore, one Light IC can be utilized, for example in a rear view mirror, to supply the various lighting devices that could be associated with the rear view mirror.

The invention also relates to a rear view display device for a vehicle, preferably for a motor vehicle, comprising at least one control circuit according to the invention. Here, the term "comprising" can be used to define that at least one control circuit can be comprised within a housing or casing of the rear view display device.

In one example, the rear view display device comprises at least two control circuits according to the invention.

In another example, at least one output channel of each one of the at least two control circuits is adapted to be combined into a third output channel. Advantageously, more than one control circuit can be arranged in the rear view display device.

In one example, the rear view display device further comprises at least one mirror element and/or at least one camera.

In another example, the at least one lighting device is comprised by at least one of a turn signal module, a blind spot signal module, a logo lamp and/or a puddle light module.

Various aspects of this invention will become apparent to those skilled in the art from the following detailed description of the preferred embodiment, when read in light of the accompanying drawings.

BRIEF DESCRIPTION OF THE DRAWINGS

FIGS. 1a and 1b illustrate schematic views of a control circuit according to a first embodiment of the invention, wherein the first and second output channels are shown separately and combined into a third output channel.

FIGS. 2a and 2b illustrate schematic views of a control circuit according to a second embodiment of the invention, wherein the first, second, and fourth output channels are shown separately and combined into a third output channel.

DETAILED DESCRIPTION OF THE PREFERRED EMBODIMENT

Figure 3:
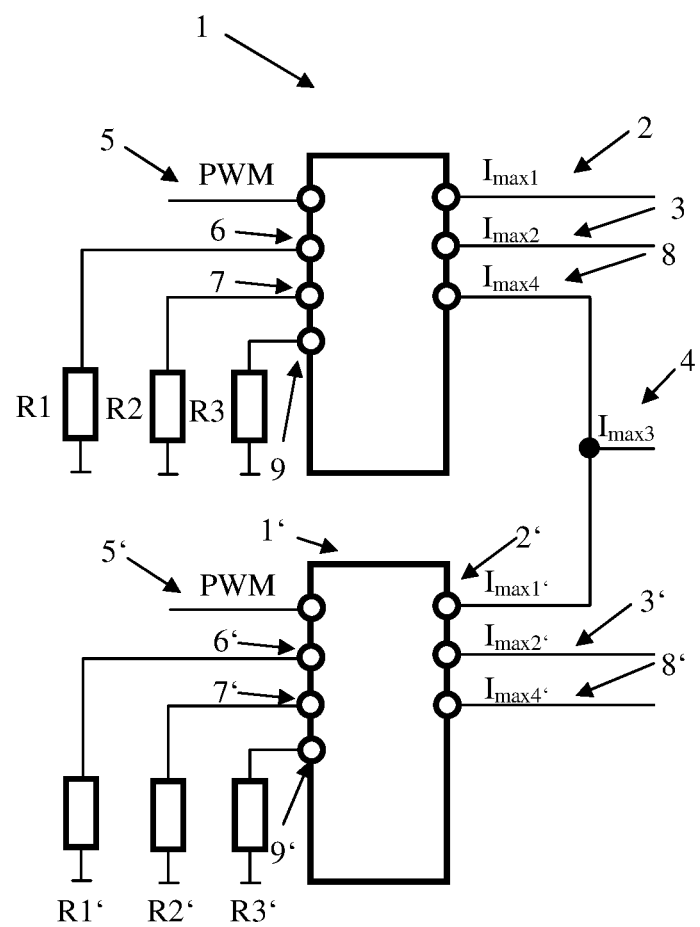
FIG. 3 illustrates a schematic view of two control circuits according to the invention, where output channels of each one of the at least two control circuits are combined into a third output channel.

The control circuit 1 for at least one lighting device in a vehicle according to a first embodiment of the invention and illustrated in FIGS. 1a and 1b comprises at least a first and a second output channel 2, 3. The at least one lighting device may be provided in a rear view display device 10 of the vehicle, which may be configured as a mirror element or a camera. FIG. 1a shows that the first output channel 2 is adapted to provide a first maximum current $I_{max1}$, while the second output channel 3 is adapted to provide a second maximum current $I_{max2}$. The first output channel 2 is adapted to control a first lighting device 12, which may be configured as one of a turn signal module, a blind spot signal module, a logo lamp and/or a puddle light module. The second output channel 3 is adapted to control a second lighting device 14, which may also be configured as one of a turn signal module, a blind spot signal module, a logo lamp and/or a puddle light module. In FIG. 1b it is shown that the first and the second output channels 2, 3 are suited to be combined into a third output channel 4 that provides a third maximum current $I_{max3}$ that corresponds to the sum of the first $I_{max1}$ and the second $I_{max2}$ maximum currents, i.e. $I_{max3}=I_{max1}+I_{max2}$. However, the skilled person would know that the third maximum current $I_{max3}$ could be also lower than the sum of the first $I_{max1}$ and the second $I_{max2}$ maximum currents. The third output channel 4 is adapted to control a third lighting device 16, which may be one of a turn signal module, a blind spot signal module, a logo lamp and/or a puddle light module.

FIGS. 1a and 1b also show that the control circuit 1 comprises at least one control channel 5. In the shown embodiment, the first $I_{max1}$ and the second $I_{max2}$ maximum currents can be controlled via a signal at the control channel 5. In the here shown example, a pulse-width modulated PWM signal is applied to the control channel 5. However, the skilled person would know that essentially any electric signal could be applied to the control channel 5, for controlling the on and off states of the lighting device.

In the embodiment that is shown in FIGS. 1a and 1b, the control circuit 1 also comprises a first and a second current control input 6, 7. In the shown example, the maximum currents provided at the first and second output channels 2, 3 are adjustable via the respective first and second current control inputs 6, 7. Therefore, resistors R1, R2, such as so-called shunt-resistors are connected to the first and second current control inputs 6, 7. These resistors R1, R2 at the first and second current control inputs 6, 7 adjust the maximum currents supplied at the respective first and second output channels 2, 3.

FIGS. 2a, 2b show schematic views of a control circuit 1 according to a second embodiment of the invention, wherein the first, second, and fourth output channels 2, 3, 8 are shown separately and combined into a third output channel 4. The control circuit 1 as shown in FIGS. 2a, 2b is essentially equal to the control circuit 1 as shown in FIGS. 1a, 1b, however, the control circuit 1 that is shown in FIGS. 2a, 2b comprises a fourth output channel 8 as well as a fourth current control input 9 having a resistor R3 connected thereto for adjusting the maximum current $I_{max4}$ supplied at the fourth output channel 8. The fourth output channel 8 may be connected to one of the first, second, and third lighting devices 12, 14, and 16. In other embodiments, as stated above, one of the first, second, and third lighting devices 12, 14, and 16 may be connected to the fourth output channel 8 and another of these lighting devices may be connected to the third output channel 4. The control circuit 1 that is shown in FIGS. 2a and 2b comprises three output channels 2, 3, 8, wherein each output channel 2, 3, 8 provides a respective maximum current Imax1, Imax2, Imax4. FIG. 2b shows that the three maximum currents Imax1, Imax2, Imax4 are combinable into a third output channel 4 that provides a third maximum current $I_{max3}$ that corresponds to the sum of the first Imax1, the second Imax2, and the fourth Imax4 maximum currents, i.e. Imax3=Imax1+Imax2+Imax4. However, the skilled person would know that the control circuit could comprise even more than three output channels 2, 3, 8 for providing a number of different maximum currents. Also, the skilled person would know that the third maximum current $I_{max3}$ could be lower than the above mentioned sum of currents.

FIG. 3 shows a schematic view of two control circuits 1, 1' according to the invention, where output channels 8, 2' of each one of the at least two control circuits 1, 1' are combined into a third output channel 4. In the shown example, the fourth output channel 8 of a first control circuit 1 is combined with the first output channel 2' of a second control circuit 1'. However, the skilled person would know that all output channels 2, 3, 8, 2', 3', 8' of the at least two control circuits 1, 1' could be combined into a third output channel 4. Also, the skilled person would know that respective output channels of additional control circuits could be combined into the third output channel 4.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A control circuit to control at least one lighting device in a vehicle, wherein the control circuit is realized in one single electric circuit, configured to be mounted in a component of the vehicle, the control circuit comprising:
   a first output channel and a second output channel, wherein the first output channel is adapted to provide a first current to at least a first lighting device, and the second output channel is adapted to provide a second current to a second lighting device, wherein the first and second output channels are suited to be combined into a third output channel, wherein the third output channel provides a third current to a third lighting device, with the third current corresponding to the sum of at least a share of the first current and at least a share of the second current, wherein the at least one lighting device comprises the first, second, and third lighting devices.

2. The control circuit of claim 1, wherein the third current equals mainly the sum of the first current and the second current and/or the third current is greater than the first current and is greater than the second current.

3. The control circuit of claim 1, further comprising:
   at least one control channel, wherein the first output channel and/or the second output channel is/are controllable by means of at least one control signal applied to the at least one control channel, wherein the control signal is a pulse-width modulated (PWM) signal, and the PWM signal is current controlled by an Electronic Control Unit (ECU) of the vehicle.

4. The control circuit of claim 1, wherein the first output channel and/or the second output channel is/are adapted to provide the first current and/or the second current to the first and/or the second lighting device, respectively, and/or the third output channel is adapted to provide the third current to the third lighting device.

5. The control circuit of claim 1, wherein the first and second output channels are adapted to provide at least two different currents, wherein the first current is about 150 mA, and the second current is about 250 mA.

6. The control circuit of claim 1, further comprising:
   a first current control input, wherein the first current is suited to be adjusted via the first current control input and a second current control input, wherein the second current is suited to be adjusted via the second current control input.

7. The control circuit of claim 6, wherein the first current and the second current are adapted to be respectively adjusted by a resistance value of a first resistor connected to the first current control input and a resistance value of a second resistor connected to the second current control input.

8. The control circuit of claim 1, further comprising:
   a fourth output channel for a fourth current, and the control circuit further comprising a fourth current control input to adjust the fourth current.

9. The control circuit of claim 8, wherein the third current corresponds to the sum of the first, second, and fourth currents.

10. The control circuit of claim 1, wherein the control circuit is configured as an integrated circuit (IC).

11. The control circuit of claim 1, wherein the first output channel defines a first current output limit, the second output channel defines a second current output limit, and the third channel defines a third current output limit, and wherein the control circuit is configured to control at least one of the first output channel, the second output channel, and the third output channel such that one of the first current, second current, and third current is outputted at the respective first current output limit, the second current output limit, and the third current output limit.

12. The control circuit of claim 11, wherein the first current output limit is associated with a current requirement of the first lighting device and the second current output limit is associated with a current requirement of the second lighting device, and further wherein the first and second output channels are combined by the control circuit to power the third lighting device at a third current that is greater than either the first output limit or the second output limit.

13. The control circuit of claim 12, wherein the first current output limit is in a range of 145 mA to 154 mA and the second current output limit is in a range of 245 mA to 254 mA.

14. A rear view display device for a vehicle comprising a control circuit to control at least one lighting device in the vehicle, wherein the control circuit is one single electric circuit, configured to be mounted in a component of the vehicle, the control circuit comprising:
   a first output channel and a second output channel, wherein the first output channel is adapted to provide a first current to at least a first lighting device, and the second output channel is adapted to provide a second current to a second lighting device, wherein the first and second output channels are suited to be combined into a third output channel, wherein the third output channel provides a third current to a third lighting device, with the third current corresponding to the sum of at least a share of the first current and at least a share of the second current, wherein the at least one lighting device comprises the first, second, and third lighting devices.

15. The rear view display device of claim 14, wherein the control circuit is a first control circuit and the rear view display device further comprises at least a second control circuit.

16. The rear view display device of claim 15, wherein the first and second control circuits each include at least one output channel that are adapted to be combined into a third output channel.

17. The rear view display device of claim 14, further comprising at least one mirror element or at least one camera.

18. The rear view display device of claim 14, wherein one of the first, second, and third lighting devices is a turn signal module, a blind spot signal module, a logo lamp or a puddle light module.

* * * * *